United States Patent [19]

Bryan

[11] Patent Number: 4,869,862
[45] Date of Patent: Sep. 26, 1989

[54] METHOD OF SHAPING AN EXTRUSION DIE

[75] Inventor: Teresa H. Bryan, Bartlesville, Okla.

[73] Assignee: Phillips Petroleum Company, Bartlesville, Okla.

[21] Appl. No.: 171,586

[22] Filed: Mar. 22, 1988

Related U.S. Application Data

[62] Division of Ser. No. 523,536, Aug. 16, 1983, Pat. No. 4,751,651.

[51] Int. Cl.$^4$ ............................................. B29F 3/04
[52] U.S. Cl. ................... 264/541; 264/40.1; 264/177.1; 264/219; 425/380; 425/465; 425/467; 425/532
[58] Field of Search ............ 264/541, 540, 167, 177.1, 264/40.1, 219; 425/380, 403, 465–467, 532

[56] References Cited

U.S. PATENT DOCUMENTS

| | | | |
|---|---|---|---|
| 3,114,932 | 12/1963 | Donnelly | 264/541 |
| 3,221,371 | 12/1965 | Stevens | 264/541 |
| 3,390,430 | 7/1968 | Lynch et al. | 264/541 |
| 4,496,301 | 1/1985 | Mozer et al. | 264/541 |

OTHER PUBLICATIONS

"Blow Molding Marlex ®", vol. 4, No. 3, The Shaped Extrusion Die, May–Jun., 1963.
"Blow Molding Marlex ®", vol. 7, No. 1., Shaping the Die Bushing, Jan.–Apr., 1966.
"Blow Molding Marlex ®" vol. 7, No. 2, Shaping the Die Bushing–Machining Calculations.
Phillips Chemical Company, Plastic Technical Center Report, SSL–178, "Die Shaping Calculation Procedures", May 1969.

Primary Examiner—Jan H. Silbaugh
Assistant Examiner—Neil M. McCarthy
Attorney, Agent, or Firm—Richmond, Phillips Hitchcock & Umphlett

[57] ABSTRACT

From the mold cross section and the position of the parison in the mold that parison wall thickness distribution (function of the wall thickness of the parison around the parison) is computed, which would result in the desired wall thickness distribution of the blow molded article; the die gap is then shaped to at least approximate the so computed parison wall thickness distribution.

7 Claims, 7 Drawing Sheets

METHOD OF SHAPING AN EXTRUSION DIE

This is a divisional of application Ser. No. 523,536, filed Aug. 16, 1983 now U.S. Pat. No. 4,751,651.

This invention relates to shaping of elements of a die, such as a bushing or a mandrel. In one aspect, the invention relates to a die having a shaped element. In another aspect, the invention relates to a process for accurately determining the shaping of die elements. In yet a further aspect, the invention relates to a blow molding apparatus. A still further aspect of this invention is a blow molding process. Yet another aspect of this invention resides in a blow molded article. A still further aspect of the invention relates to a process of approximating the required shaping of a die for an accurately blow molded article.

BACKGROUND OF THE INVENTION

Blow molding of plastic parts is a mature techology. The basic process involves extrusion of a tubular molten mass of plastic called a parison, enclosing the extruded tubular parison while still in a semi-fluid state in a mold, and expanding the parison by creating a pressure differential between the parison inside and the parison outside into contact with the mold. The solidified expanded parison, now a blow molded article, is removed from the mold and may be further processed.

Uneven wall thickness distribution of blow molded articles has been a problem in the blow molding technology. One solution to solve this problem has been die shaping. Die shaping involves cutting grooves or indentations (called shapes) on the land area (die area located upstream of the die opening) of the bushing and/or the mandrel at one or more locations such as to produce a parison having uneven wall thickness distribution, the thicker wall material being located at an area of the parison which corresponds to the area of the molded article wherein undesirably thin wall section distributions have been encountered prior to the shaping. The more complex a mold is, that is the more a mold deviates in cross section from a circular cross section, the more significant the unevenness of the wall thickness of the blow molded articles becomes.

The known shaping procedures are basically empirical. Trial and error techniques such as crayon marking on the molten parison while hanging between operating mold halves in order to determine the precise location of the required shaped areas of a molded article relative to the parison have been used. The degree of shaping, and particularly the depth, the width and the length of the shaping are also based on trial and error. For every new mold and for every new die these values had again to be determined in a time consuming, frustrating and expensive procedure.

THE INVENTION

It is one object of this invention to provide a shaped die based on predictive die shaping.

It is another object of the invention to determine the required die shaping prior to the blow molding of the article.

Another object of this invention is to provide an extrusion die which is shaped to at least approximate the precise die gap required for a desired wall thickness distribution of an article blow molded in a given mold.

A yet further object of this invention is to provide a process to form a blow molded article having preselected and defined wall thickness distribution.

Yet another object of this invention is to provide a blow molded article having a preselected defined wall thickness distribution.

These and other objects, advantages, details, features and embodiments of this invention will become apparent to those skilled in the art from the following detailed description of the invention and appended claims as well as the drawings in which

FIG. 3, A and B, show the geometry on which the computation of the radius, width and offset of the die shape is based;

In accordance with this invention, it has been found that it is possible to precisely calculate the die gap based upon a given mold cross section and a given wall thickness distribution in the mold and that based on this calculation the die can be shaped to at least approximate the so calculated die gap. It has been found that even with only a few shaping cuts a die can be produced which allows blow molding of an article with an approximation to the desired wall thickness distribution which heretofore was not achievable.

In yet other terms, the present invention comprises computing, preferably automatically in a computer, the die gap width as a function of the location around the die gap from the desired wall thickness distribution in a given mold cross section. This computation is preferably accomplished by determining the function of parison thickness along the mold in the given mold cross section, based on preferably a circular cross section parison with uniform thickness. It is, however, within the scope of this invention to base this computation on other kinds of parison cross section and arrangement in the mold when the blow molding begins. Thus, it is conceivable that prior to blowing the mold closes onto the parison and causes partial freezing of the parison on this wall while the blowing is thereafter carried out for the remaining parts of the mold. Yet another possibility for establishing the function of wall thickness (of the molded article formed using an unmodified die) with respect to die location (e.g. the angle around a circular die) is to measure the wall thickness of the molded article along the mold cross section and to thereby establish a function of wall thickness versus length along the mold and then by equating the approximate parison cross section between adjacent measured points with the incremental parison cross section around the die gap from a previous point (or the starting point) to the next point, thereby establishing the functional relationship of actual wall thickness versus die gap location. In each instance one important feature of this invention resides in the determination of both the wall thickness of a given parison element as it contacts the mold wall and freezes there and the azimuthal location of the respective element on the original parison; thus a correlation between the actual wall thickness which is achived in the mold by a parison element and the origin of this parison element from a specific location around the die gap is generated. In other words, a functional relationship of actual wall thickness and position along the die gap is established from the relative arrangement and shape of mold and die gap. At least for a plurality of points, the actual wall thickness for a given point of the die gap is thus determined.

Then the function of the ideal die gap for each die gap position is determined by comparing the actual wall thickness computed as described with the desired wall thickness at the respective mold location. To establish the ideal die gap the so determined deviation of the desired wall thickness from the actual wall thickness is established for each point of said plurality of points along the die gap. Thereby a functional relationship between the ideal die gap and the plurality of points along the die gap is established. Thus, if at a given azimuthal location the desired wall thickness is x percent greater than the actual wall thickness, then the actual die gap at that location is to be increased by x percent to result in the ideal die gap at that location or point. Since the ideal die gap as a function of the position on the die gap is frequently quite complicated, it is preferred to only approximate this function of the ideal die gap by a limited number of cuts on one or more of the die elements. The die, after the shaping in accordance with this invntion, can no longer be randomly oriented in the machine relative to the mold. Rather, since the shaping is based on the correlation between the orientation of the mold and the die, this die has to be placed in the machine so that the azimuthal location of the shaped die is the same as computed. Sometimes, in symmetrical cases, the die can be rotated, e.g. 180° with essentially no change in the resulting wall thickness distribution.

In accordance with a preferred method of this invention, the following steps are carried out in this sequence:

a. From a given mold cross section and parison extruded with constant wall thickness the wall thickness distribution of this parison blown into the mold with given cross section is calculated.

b. From this calculated wall thickness distribution, the deviations from a desired wall thickness distribution as a function of the positions of the respective wall area on the parison and thus on the die is calculated.

c. At least one of the die elements (e.g. mandrel or bushing) are shaped so that the extruded parison from the so shaped die has such a wall thickness at a given azimuthal parison location that after blow molding the desired wall thickness distribution within the mold is at least approximated.

In yet more specific terms and preferably the calculation of the die gap width is carried out as follows in accordance with this invention:

The computation starts from the following given parameters which are defined by the shape to be molded and the machine including the die and the mold and their relative locations as well as the parting line of the mold:

a. An unmodified parison wall thickness distribution around the tubular parison as extruded; most preferably this unmodified wall thickness distribution will be an essentially constant thickness around the parison.

b. A given mold cross section taken perpendicularly to the parison axis; the mold can have varying cross sections along the parison axis; however, the cross section of the greatest significance is to be chosen, preferably this will be cross section axially at approximately the central portion of the mold.

c. The position of the parison in the mold, or correspondingly, the location of the parting line or pinch line of the mold and the location of the parison axis in the mold; the latter defines where the parison first contacts the mold.

The next step is to determine the wall thickness distribution along the chosen mold cross section and to determine the correlation of at least a plurality of wall thickness values to the location on the parison, i.e. the circumferential or azimuthal location on the parison; this is done by determining the initial contact point (or points) of the parison with the mold and determining how this parison during the blowing step contacts the wall of the mold, the sections of the parison getting in contact with the wall, freezing and thereby being immobilized with no further movement of the plastic along the mold wall. This computation is based on geometrical considerations only together with the assumption that the parison will take the shape to enclose the largest volume for a given surface area or stated congruently the smallest surface area for a given volume that is possible within the mold. The correlation between the azimuthal location or circumferential position on the extruded parison and any given point along the mold cross section is given by the fact that the quantity of resin frozen at the mold wall between the reference point and the given point of interest on the mold section in question is the same as the quanity of material between the reference point on the parison and the azimuthal location or circumferential position on the parison to be determined.

After at least for some points around the mold cross section the calculated wall thickness and the corresponding location of these points on the parison have been determined, the die gap is modified or shaped so that the final die gap opening along the die gap is directly related to the deviation of the desired wall thickness from the calculated wall thickness; preferably this is done using a parison having uniform wall thickness distribution. Thus, if the desired wall thickness is x percent larger than the calculated wall thickness at a given location then the die gap is modified to at least approximate an x percent die gap increase at a location in the die which corresponds to the previously determined location on the parison for this specific calculated wall thickness. This shaping step is preferably carried out only in an approximating manner. It is particularly preferred to shape the bushing and/or the mandrel defining the die gap only by 6 to 20 "circular" cuts. If the given cross section of the mold is defined by n straight line elements it is generally enough to carry out the shaping by up to 2n cuts. Specifically in the case of a rectangular mold cross section it is preferred to use 8 generally overlapping circular cuts. The depth (e.g. in thousands of an inch) and the width (e.g. in degrees) of these cuts is mathematically precisely determined in accordance with this invention. The cuts themselves are otherwise made with conventional tools, e.g. on a lathe, and utilizing conventional techniques. Particularly the axial length of the cuts are determined based on the plastic used, the die gap average width, the general die gap shape etc. Frequently, the axial length of the shaping cuts which taper and converge in the upstream direction is in the same order of magnitude as the width of the cut.

The computed cutting or shaping is applied to the die preferably at an axial location slightly upstream of the die opening. The specific location axially within the die for the precise or approximated shaping of the die gap is defined by the requirement of sufficient pressure gradient at that location to allow a side flow of plastic material within the unsymmetric die gap which is more than inconsequential. The more viscous the plastic material extruded or the greater the die shaping (depthwise) the more upstream the location has to be. Generally, speaking, the above characterized location will be axially upstream from the die opening approxmately 1 to 5 times, usually 2.5 to 3.0 times and preferablly about 2.7 times the average die opening width.

In accordance with a first embodiment of this invention, a process for producing a die element for an extrusion die comprising as the die elements a bushing and a mandrel is provided. In accordance with this process, the desired wall thickness distribution within a given, preferably non-circular cross section of a mold is selected. The width of the ideal die gap along the die gap is calculated from the desired wall thickness distribution. The die element is then shaped based on the so calculated width of the die gap such as to produce a shaped die element as the product of the process. The calculation of the ideal die gap is such that a parison extruded from a die having the so calculated width along the die gap when blown into said mold would have said desired wall thickness distribution along said cross section.

Another embodiment of this invention resides in a die element shaped such as to at least approximate the die gap width computed as described.

A still further embodiment of this invention resides in an apparatus comprising a die containing at least one element shaped as described.

Still another embodiment of this invention resides in a process for blow molding a plastic article. This process comprises extruding a parison from a die in accordance with this invention and blowing the so extruded parison into the mold having the given cross section such as to form a blow molded article having at least approximately the desired wall thickness distribution.

The so blow molded article constitutes a further embodiment of this invention.

The following details, features and elements of the invention, individually or in combination, constitute preferred variations for each of the above embodiments of this invention where applicable. The described details and examples are not intended to unduly limit the scope of this invention, however.

Die Gap

The present preferred method of shaping the die comprises to shape the bushing by a cutting operation. This operation is best carried out on a lathe. It is, however, within the scope of this invention to use other shaping techniques and/or to shape the mandrel of the die.

While the numerical limitations as to how far the die elements can be shaped in accordance with this invention will depend to a significant extent from the plastic material used, the shear involved in the process, the average die gap width, the die conicity and other parameters it has been found that the shaping in accordance with this invention allows a degree of shaping in excess of what was previously possible. Thus, the following shows typical, practical and preferred ranges for the magnitude of die shaping depending upon the die gap width.

| Shaping Ranges for Varying Die Gap Widths | | |
|---|---|---|
| Die Gap Width (in mils) | Percent Shaping of Die Gap Practical Range | Percent Shaping of Die Gap Preferred Range |
| up to 30 | 40–150 | 70–140 |
| 30–110 | 60–200 | 100–200 |
| 100–200 | 150–300 | 150–280 |

It is to be understood that the above values show approximate ranges or typical values and only characterize the largest recommended shaping depth around a die to be shaped. The actually employed value will of course depend upon the shape of the mold and calculated wall thickness distribution of the article.

Materials

The present invention is applicable to many plastic materials which are used in blow molding operations. Particularly preferred are ethylene polymers and copolymers, in particular polyethylene and copolymers of ethylene and 1 to 20 mole percent of olefins having 4 to 10 carbons atoms per molecule, propylene polymers and in particular polypropylene and copolymers of propylene and small amounts of other olefins.

Die Gap Calculation

One of the most significant features of this invention resides in the computation of the die gap width at least at some points around the die gap circumference. It is possible, in accordance with this invention, to calculate the die gap width around the die gap circumference precisely.

The first step in this computation constitutes a determination of the wall thickness distribution in a given mold obtained with a parison of uniform wall thickness. This computation has been described in some detail in an article by H. Fukase et al: "A Method of Calculating the Wall Thickness Distribution in Blow Molded Articles", found an ANTEC Journal of Society of Plastic Engineers, 36th Annual Technical Conference, Apr. 24–27, 1978.

The computation is generally and preferably based on two dimensional considerations in the plane containing the selected mold cross section which plane is perpendicular to the parison axis. The calculation is also based upon the parison shape at any given moment being in the shape of a circle or a fraction of a circle. When the parison cross section touches two walls the circle is simply defined by a tangential contact of those two walls at the selected points. Slightly different considerations apply when the parison contacts only one wall or is blown around a corner. The computation also takes a different form when the parison is blown into a mold with a cross section that is not essentially a polygon or other assymetrical shape. However, the approach and theory in all of these computations remains the same. In each computation the wall thickness is determined based on the wall thickness at a previous point by expanding the remaining material, i.e. the material remaining after subtracting the material frozen to the wall between the previous point and the presently investigated point from the previously remaining material into an essentially circular cross section having a radius and angle as determined from the given mold cross section. This computed thickness relate to that azimuthal or circumferential location on the parison as extruded (or respectively around the die gap) at which the total material between the location of interest and the reference point is the same as the total material that has been frozen between the reference point to the mold and the point at which the wall thickness has just been determined.

The computation is preferably carried out in a large number of small steps, so that the movement and freezing of the parison wall is approximated and simulated by a large number of small increments along the mold with the proviso that the wall thickness in each increment remains constant. It is within the scope of this invention to establish the thickness of the blow-molded wall as a function of the position on the die opening by solving one or more differential equations.

The above computation will become more apparent in connection with a computer program which has been written for an essentially rectangularly shaped mold cross section. This program will be described step by step in the following.

Program for Computing the Percent Increase in Die Gap Required to Obtain Uniform Wall Thickness Distribution in a Rectangular Blow Mold

| 1 | DIMENSION X(1000), T(1000), RX(1000), FA(1000), DEG(1000) |
| --- | --- |
| 2 | DIMENSION PC(1000) |
| 3 | READ(5,*) T1,XL,W,RC |
| 4 | R=W/2. |
| 5 | H=(XL−W)/2. |
| 6 | TA=3.1416*R*R−3,1416*(R−T1)*(R−T1) |
| 7 | ICOUNT=(XL/2.−RC)*100. |
| 8 | JCOUNT=H*100 |
| 9 | Y=0.0 |
| 10 | XFA=0.0 |
| 11 | XT=T1 |
| 12 | DO 10 I=1,JCOUNT |
| 13 | X(I)=Y+.01 |
| 14 | DFA=4.*.01*XT |
| 15 | FA(I)=XFA+DFA |
| 16 | UFA=TA−FA(I) |
| 17 | DEG(I)=90.−FA(I)*90./TA |
| 18 | T(I)=R−SQRT(R*R−UFA/3.1416) |
| 19 | PC(I)=(T1−T(I))/T(I)*100. |
| 20 | Y=X(I) |
| 21 | XT=T(I) |
| 22 | XFA=FA(I) |
| 23 | K=I+1 |
| 24 | 10 CONTINUE |
| 25 | DO 20 I=K,ICOUNT |
| 26 | X(I)=Y+.01 |
| 27 | DFA=8.*.01*XT |
| 28 | FA(I)=DFA+XFA |
| 29 | UFA=TA−FA(I) |

-continued

Program for Computing the Percent Increase in Die Gap Required to Obtain Uniform Wall Thickness Distribution in a Rectangular Blow Mold

| 30 | DEG(I)=90.−(FA(I)+FA(K))/2*90./TA |
| --- | --- |
| 31 | RX(I)=XL/2.−X(I) |
| 32 | XRX=RX(I) |
| 33 | T(I)=XRX−SQRT(XRX*XRX−UFA/3.1416) |
| 34 | PC(I)=(T1−T(I))/T(I)*100. |
| 35 | Y=X(I) |
| 36 | XT=T(I) |
| 37 | XFA=FA(I) |
| 38 | 20 CONTINUE |
| 39 | WRITE(6,100) |
| 40 | 100 FORMAT(1X,'DISTANCE FROM CENTER',2X,'THICKNESS',2X,&'DEGREES FROM CENTER',2X,'PERCENT INCREASE') |
| 41 | WRITE(6,200) (X(I),T(I),DEG(I),PC(I),I=10,ICOUNT,10) |
| 42 | 200 FORMAT(11X,F8.2,3X,F8.3,13X,F8.3,10X,F8.3) |
| 43 | CFA = 3.1416*XT/2.0*(2.0*RC − XT) |
| 44 | DEGC = 90.0 − ((XFA+FA(K))/2.0 + CFA)*90.0/TA |
| 45 | WRITE(6,300) XT,DEGC,PC(ICOUNT) |
| 46 | FORMAT (13X,'CORNER',F15.3,F21.3,F18.3) |
| 47 | STOP |
| 48 | END |

Abbrebiations Used:
T1 = maximum wall thickness, or initial wall thickness
XL = length of the molded article or mold cross section
W = width of the molded article or mold cross section
RC = corner radius of the molded article or mold
R = radius of parison at instant it first touches the mold wall
H = length along the mold walls that parison travels while in a semicircle configuration
TA = total cross sectional area of parison
ICOUNT = number of increments (total); starts at 0 and moves 0.01 inch along the wall from point of first contact to the start of the corner radius
JCOUNT = number of increments to move parison along in quarter circles; starts at 0 and moves 0.01 inch along the wall to the point where the corner is contacted
Y = intermediate position along the wall
X(I) = dimensioned position along the wall
DFA = area of the parison frozen at each count (increment)
XT = parison wall thickness at each X(I); this value changes with I
XFA = parison total frozen area at each X(I) carried over
FA(I) = parison total frozen area at each X(I)
UFA = total area of the parison remaining unfrozen after each X(I) area is subtracted
DEG(I) = degrees around the parison at each X(I)
T(I) = parison thickness at each X(I)
PC(I) = wall thickness percent increase at each X(I); this is the die gap increase required. This die gap increase is the same as the percentage thickness decrease at the given X(I) over the initial thickness on the article formed from parison with a constant wall thickness
K = counter of positions (incremental changes) toward H; this enables the next loop to start at the correct position
FA(K) = parison frozen area up to point H
RX(I) = radius of parison shape at X(I)
XRX = carryover radius to next loop
CFA = parison corner frozen area from start of corner radius to corner
DEGC = degrees from parting line to corner location on the parison The above program in Fortran Language proceeds as follows. The following numbers are the line numbers of the program shown above.

1., 2. Dimension statements.

3. Maximum or desired thickness, length, width and corner radius of the molded article is read.

4. Parison radius R at first wall contact is calculated; the width is the shorter dimension of the article.

NOTE: At this point the parison will now travel as 2 semicircles outward from the initial parison extrusion location.

5. The length H that parison travels in semicircles shape along the mold wall is calculated.

6. The initial total area (TA) of the parison cross section is calculated from the external radius R and the width T1 of the ring cross section of the parison.

7. The total number of increments the parison will travel is calculated; since the rectangular mold and the parison are arranged in a symmetrical way the computation only has to be done for one quarter of the mold, the computation only has to be done along half of the long side and only until the corner radius curvature starts at which point the parison will contact all the corner surface at one time. Since XL and RC are read in inches and since each step has been chosen to be 0.01 inches a multiplication by 100 in the above formula follows.

8. The number of computation steps JCOUNT for which the parison is moved in semi circles along the wall is computed.

9.10.11. The initial values for the three parameters are set.

12. Beginning of the loop of calculations that cover the parison movements from point of first contact of the wall to position H.

13. The position X(I) along the wall is determined.

14. The incremental frozen area of the parison on wall at X(I) is determined; 0.01 is the length of the increment, XT is the thickness of the wall, and the factor 4 is used because the parison contacts two walls and is expanded in two direction so that four incrementally frozen areas have to be used (only one quarter of the mold is being examined).

15. The total frozen area of the parison at X(I) is computed by adding the incremental frozen area to the previously determined total frozen area.

16. The total remaining unfrozen area of the parison at X(I) is determined by substracting the total frozen area computed in step 15 from the total area previously computed in step 6.

17. This important step determines the azimuthal or circumferential position DEG(I) on the parison that corresponds with the X(I) wall thickness section in the mold from a 0° starting position (and correspondingly in the die gap). This computation is based on the fact that the quotient of total frozen area at X(I)/total area represents that fraction of 90° on the parison that still remains unfrozen; attention is drawn to the fact that the formula used in line 17 changes the points of reference from the center of the part to the parting line which is solely done for the benefit of the machinist; this line calculates the degrees on the parison which corresponds to the position X(I) on the mold.

18. Determines the wall thickness T(I) of the next parison section of interest by solving the equation $$UFA = \pi r^2 - \pi^*(R - T(I))^2 \text{ for } T(I).$$

19. Calculated the percent increase necessary to bring the actual wall thickness T(I) to the initial wall thickness T1.

20., 21., 22. Set the initial values of Y, XT, XFA for the next loop to those values just calculated.

23. Count increment.

24. Returns the program to line 13; the loop just described is now repeated until JCOUNT has reached the value computed in line 8.

25. Starts the loop for computing wall thickness and azimuthal position for those incremental changes where the parison contacts the next walls which for the rectangular shape are under 90°; attention is drawn to the fact that in this loop the radius as well as the thickness change while in the previous loop the radius did not change since the two walls along which the parison was moved were parallel.

26. This is again a 0.01 inch step, see line 13.

27. See line 14; since the parison is now moving into four corners from 2 directions each and thus freezing in eight different areas, the factor 8 had to be used.

28. Frozen area computation, see line 15.

29. See line 16.

30. Same explanation as line 17; note, however, that FA(K), the total area frozen at the end of the previous loops (those of lines 13–24) had to be added; instead of the formula shown in line 30, the computation could have also been based on DEG(I)=-DEG(K)-FA(I)/2*TA*90°.

31. This line computes the radius of the parison at it moves into the corner which decreases in each step by the amount of movement during the step. This is the case because the two walls of the mold are oriented perpendicularly to each other.

32. Sets the value XRX to the previously computed radius value for the following computation.

33. Same computation as line 18, except that a new radius for each increment in frozen area is determined and used in each cycle of the loop.

34., 35., 36., 37. Same as 19., 20., 21., 22., respectively.

38. Continues the loop by returning the program to line 26 until ICOUNT has reached the value previously computed in line 7.

39.–42. Writing and formatting statements.

43. Computes frozen area of the parison in the corners.

44. Computes azimuthal or circumferential position of the point of interest from the parting line to the corner of the mold on the parison or, respectively along the die gap similar to step 17.

45, 46. Writing and formatting statements.

47., 48. Program end.

Figure 1:
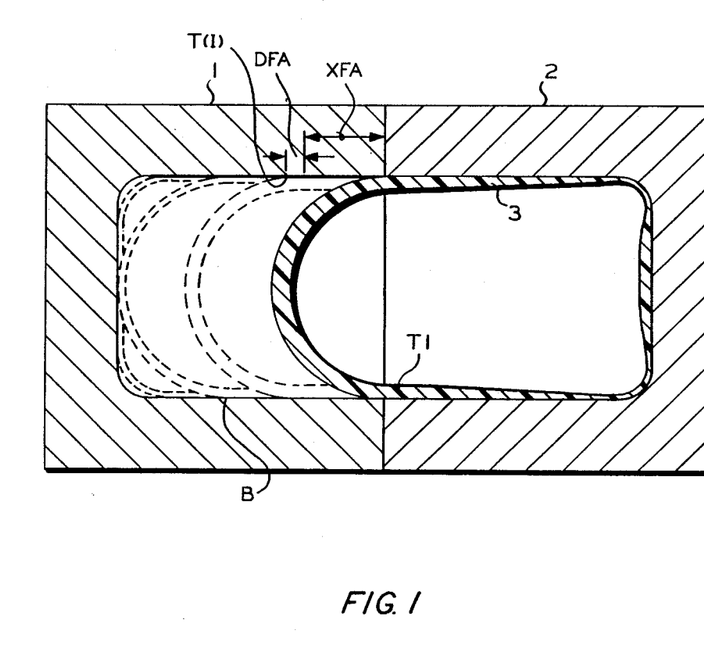
FIG. 1 is a schematic cross sectional view of a mold with a uniform wall thickness parison in various stages of the blowing process as well as with a cross sectional view showing the wall thickness distribution of a finished blow molded article obtained with the uniform wall thickness parison both residing interior to the mold.

In FIG. 1, the blow molding of an object with a shape having essentially rectangular cross section is shown. The parison is shown pinched between two mold halves 1 and 2. The drawing shows various parameters in the same abbreviations as used in the program. Reference to the above list of abbreviations is herewith made. Attention is drawn to the fact that the above abbreviations have been used in FIG. 1 for clarity only on one section while it is understood that some of the abbreviations refer to four times or eight times the respective amount.

Position B of the parison in FIG. 1 shows the position where the first program loop in the above described program ends and the second program loop begins. In the right hand side of FIG. 1 the molded object starting from a parison with uniform wall thickness is shown to illustrate the non-uniform wall thickness distribution in an exaggerated fashion.

Figure 2:
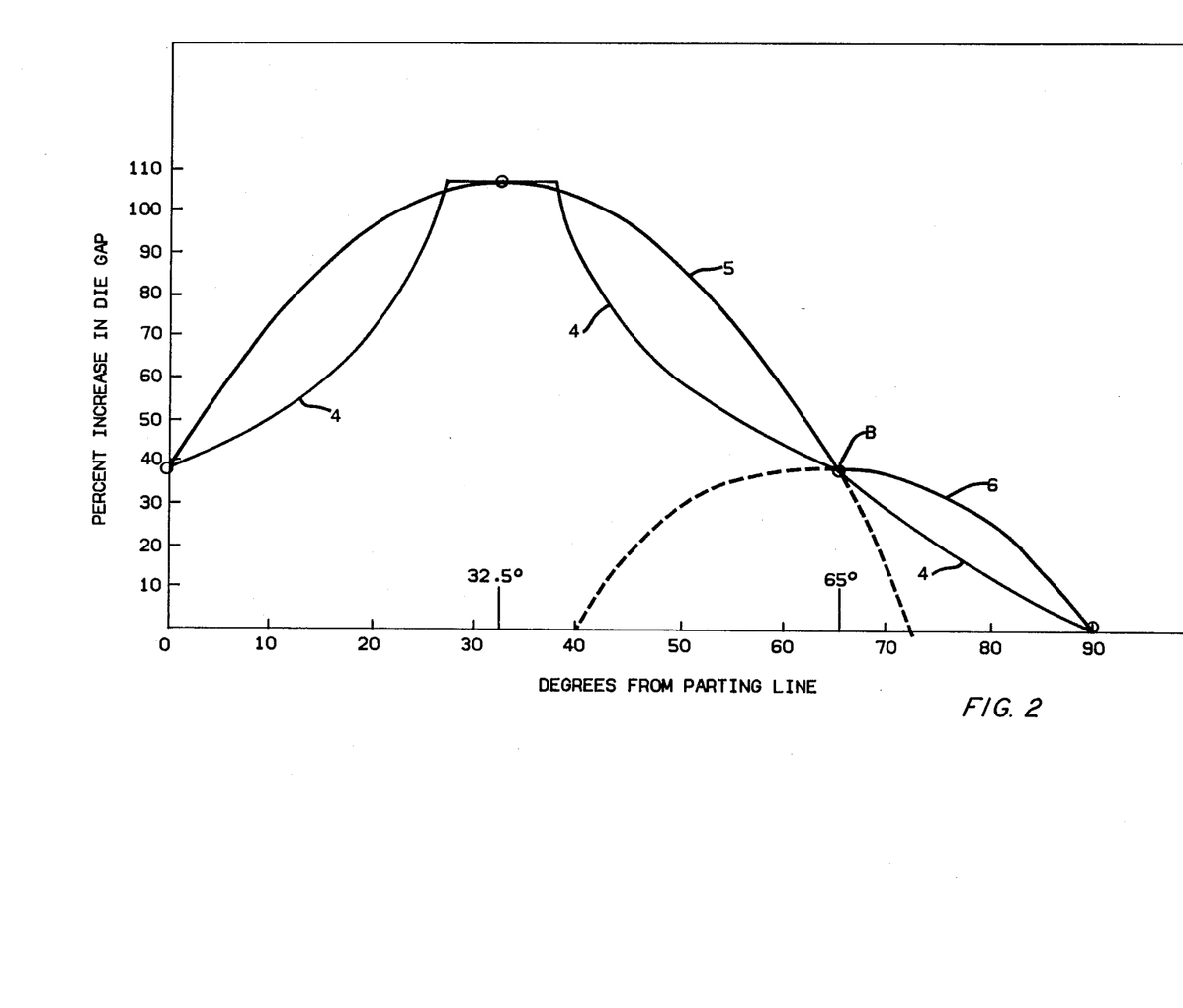
FIG. 2 is a graphical diagram plot showing the computed percent increases in die gap from the preselected die gap as a function of the angle (azimuthal position) from the mold parting line, as well as the actual percentage increase in die gap used to approximate the computed values which uses two symmetrical circular cuts; the plot is shown for a quarter of the circumference of the die gap.

In FIG. 2 the result of the above described computer program is graphically displayed. The percent increase in die gap as a function of the angular position around the die gap from the parting line of an essentially circular die is shown. This curve 4 which resembles a volcano of FIG. 2 also illustrates the percent change in wall thickness along the wall 3 of the molded object in FIG. 1, except that the abscissa does not describe the angle in FIG. 1 but rather the angle on the die or on the just extruded parison.

In addition to curve 4 defining the precise increase in die gap necessary to completely compensate for the wall thickness deviations incurred using an unshaped die and thus required for achieving a uniform wall thickness distribution throughout the object molded in a mold as shown in FIG. 1, FIG. 2 also shows the approximation of this curve made by two circular cuts 5 and 6. The precise computation of these circular cuts 5 and 6 based on the volcano shaped curve in FIG. 2 will be described in connection with FIGS. 3A and 3B.

For a rectangular cross section or for an essentially rectangular cross section with rounded corners it is preferred to approximate the corner section which will have a symmetrical portion of the die gap increase function on both sides of the corner location. In other words, the curve between 0° and 65° is symmetrical to the 32.5° point which is the angle of maximum shaping and is preferably approximated by one single cut. The next portion of the curve, i.e. the portion between 65° and 90°, can be approximated by one cut which is symmetrical to the 65° position which also is the angle of second maximum shaping, i.e. one circular cut from 40° to 90°. It is, however, possible to change this cut between the two points 65° and 90°, since these two points alone do not yet define a circle. The difference between the 32.5° point and 65° point is the $\theta$ set forth in the program. However, for simplicity and ease of operation it is preferred to utilize a symmetrical cut in this situation, too, i.e. to provide for a cut which is symmetrical to point B (65°).

Figures 3A, 3B:
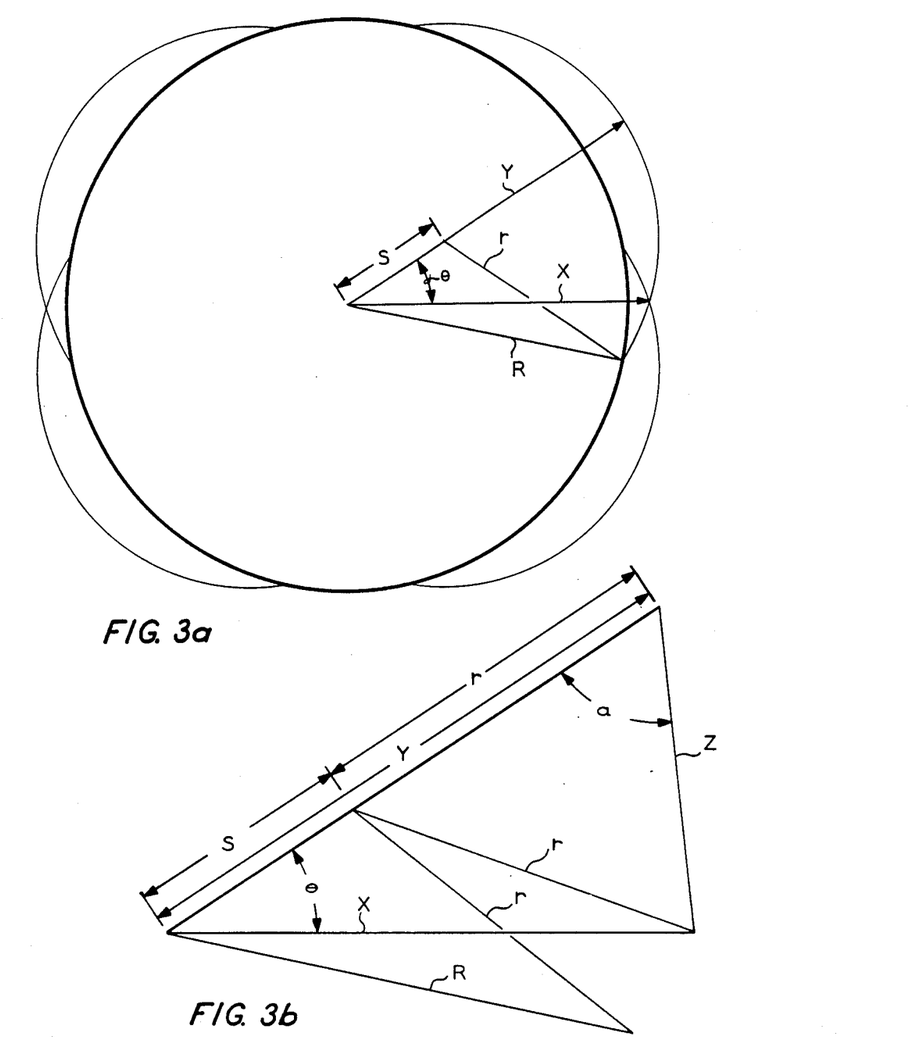

Reference is now made to FIGS. 3A and 3B which illustrate how the cutting radius and offset of the die shaping is computed from the given values of the die as well as the values computed in the above described program.

The radii of cuts r are found based upon the following computation, reference is made to the geometry in FIGS. 3A and B. FIG. 3B is an enlarged view with more details and additional symmetrical geometry of FIG. 3A.

Die Cutting Calculations

- $DG$ = die gap (known)
- $PC$ = percent increase at corner (program), which is $PC(ICOUNT)$
- $PH$ = percent increase at parting line (program), which is $PC(FCOUNT)$
- $\theta_1$ = angle (in degrees) between the parting line and corner line read on the parison (program); this is the angle for the first cut relative to the location on the cut element that corresponds to the mold parting line.
- $\theta_2$ = corresponding angle for the second cut
- $R$ = radius of die bushing (known)
- $r_1$ = radius of first cut (find)
- $S_1$ = offset of first cut (find)
- $r_2$ = radius of second cut (find)
- $S_2$ = offset of second cut (find)
- $Y_1 = R + (PC \times DG)$
- $X_1 = R + (PH \times DG)$
- $Z_1 = (X_1^2 + Y_1^2 - 2X_1Y_1\cos\theta_1)^{\frac{1}{2}}$
- $a_1 = \arcsin\left(\dfrac{X_1}{Z_1}\sin\theta_1\right)$ With these values of the first cut ("corner cut") is defined as follows:

$$r_1 = \dfrac{Z_1}{2\cos a_1}$$
$$S_1 = Y_1 - r_1$$

Figure 7:
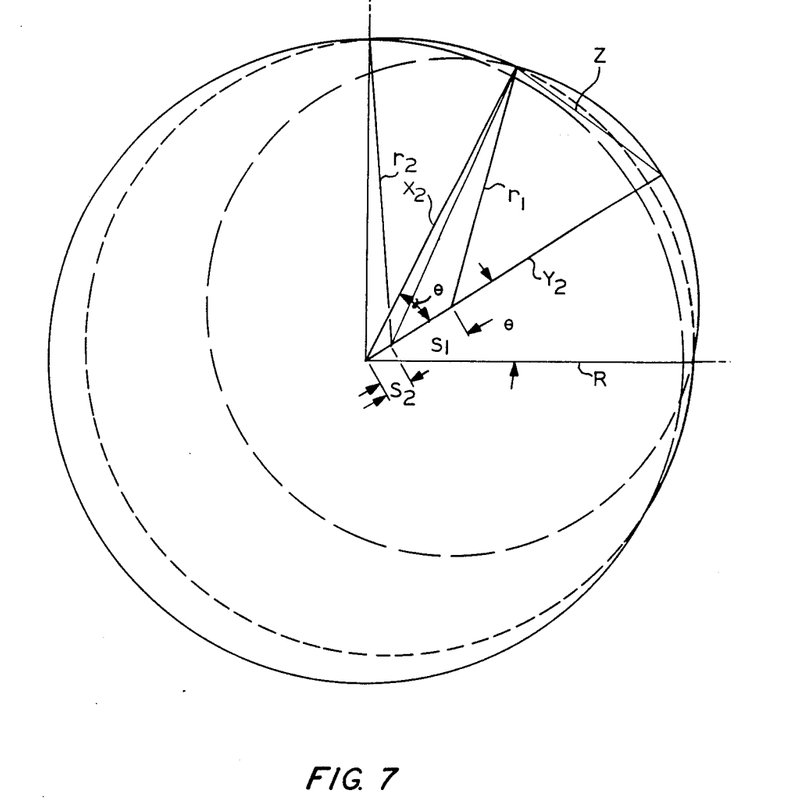
FIG. 7 shows the geometry of two cuts approximating the computed percent increases in wall thickness, the two cuts being made at the same azimuthal location.

Similarly for the second cut ("parting line cut") the following values result:

- $\theta_2 = 90 - 2\theta_1$
- $Y_2 = R + (PH \times DG)$
- $X_2 = R$
- $Z_2 = (X_2^2 + Y_2^2 - 2X_2Y_2\cos\theta_2)^{\frac{1}{2}}$
- $a_2 = \arcsin\left(\dfrac{X_2}{Z_2}\sin\theta_2\right)$
- $r_2 = \dfrac{Z_2}{2\cos a_2}$
- $S_2 = Y_2 - r_2$ In another embodiment which is shown in FIG. 7 the second cut for shaping the die gap for a rectangular mold cross section can be made using as the azimuthal cutting position for the second cut the same as that for the first cut; in this embodiment the following relations apply (the values for $r_1$, $S_1$ etc. remain of course the same as above):

- $\theta_2 = \theta_1$
- $X_2 = X_1$ (above)
- $S_2 = \dfrac{R^2 - X_2^2}{2R\sin\theta_2 - 2X_2\cos\theta_2}$
- $r_2 = (S_2^2 + X_2^2 - 2S_2X_2\cos\theta_2)^{\frac{1}{2}}$ Using the angles $\theta_1$ and $\theta_2$, the offsets $S_1$ and $S_2$ and the cutting radii $r_1$ and $r_2$ the shaping (8 cuts) of the die is defined.

Figure 4:
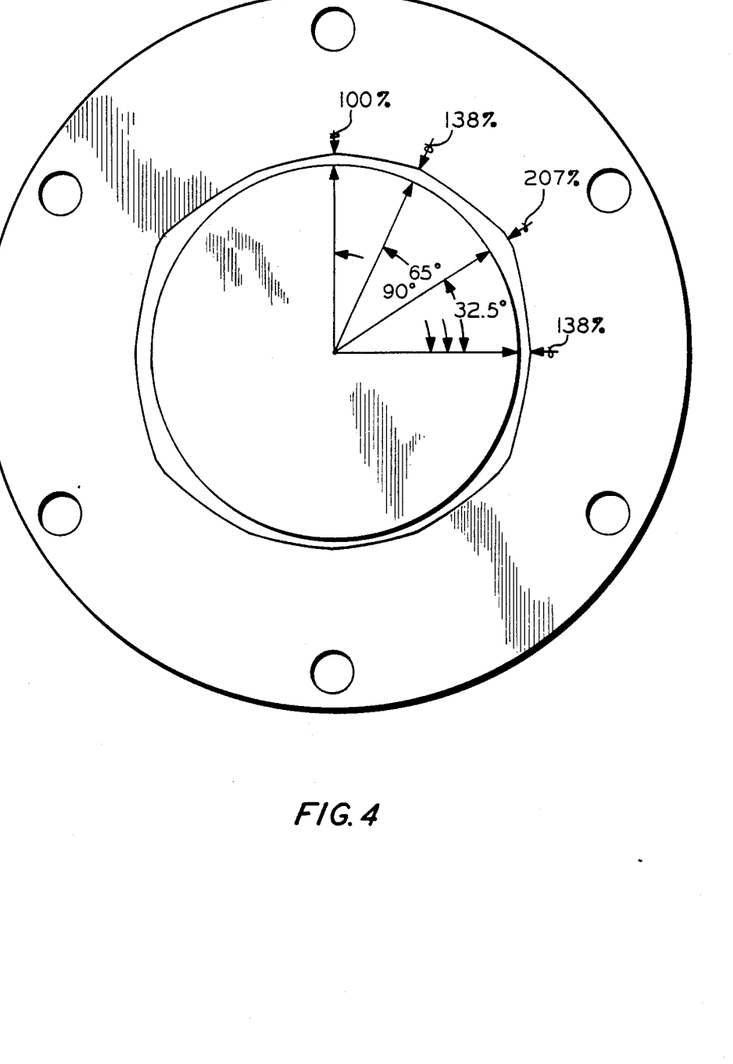
FIG. 4 shows an enlarged, exaggerated cross section of the die gap at the die face corresponding to the computed representation in FIG. 2.

In FIG. 4 a still slightly exaggerated die gap cross section at the die opening is shown which corresponds to the curve 4 representation of FIG. 2. The four significant angles and the respective precentage increase values for the die gap are shown in FIG. 4. The parting line is located at 0° in FIG. 4. As shown, the 8 overlapping cuts in the bushing extend completely around the circumference of the die gap.

It should be noted that the preferred die comprises a bushing and a mandrel which forms an essentially frustoconically shaped opening between them; this frustoconus tapers outwardly in the direction of the flow of the plastic material near the exit end of the die. The shaping cuts also taper outwardly beginning at an upstream location and increasing to the ultimate width gradually in the flow direction of the plastic material near the die face opening.

Figure 5:
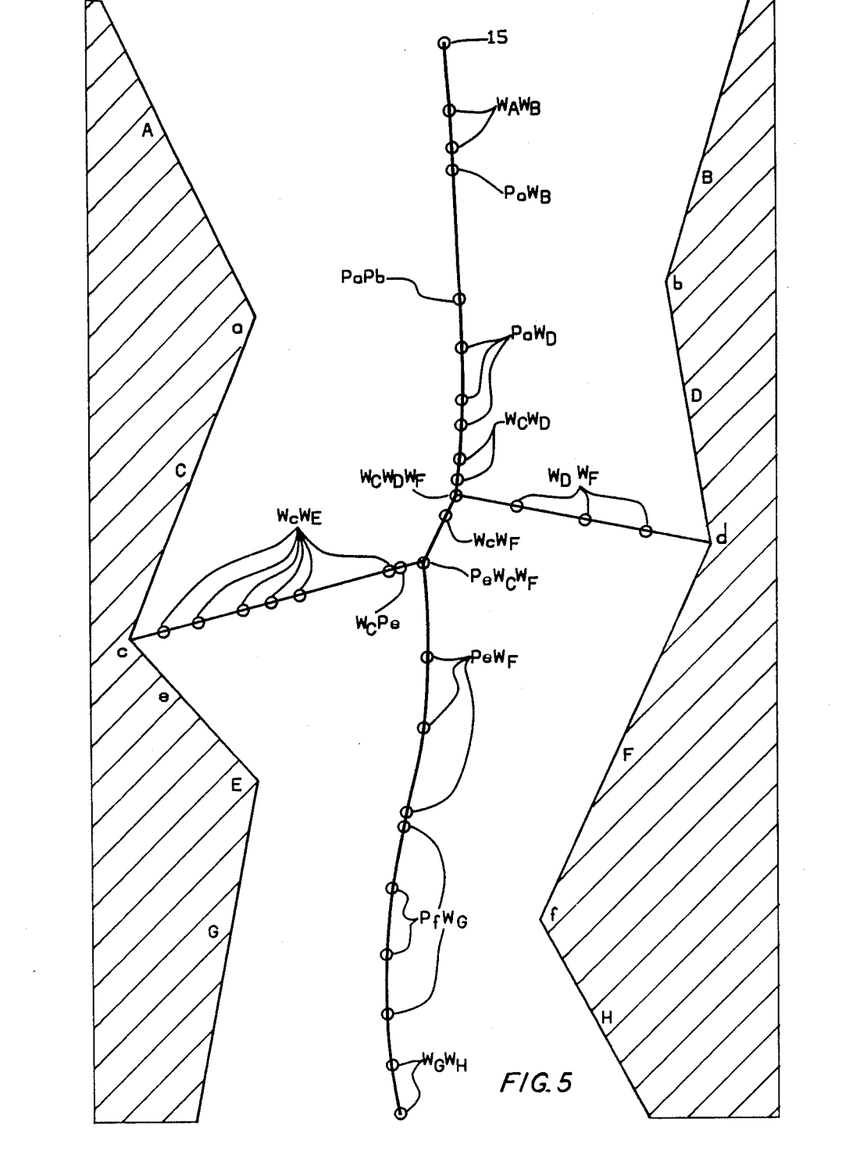
FIG. 5 shows a diagrammatic representation of the line of travel of the parison center point as the parison is blown in a complicated mold environment, the center points being used in the computation of the wall thickness distribution in a more complicated situation.

FIG. 5 illustrates a complicated mold shape to show how the corresponding calculation in such a complicated environment can be carried out. The calculation is again based on the parison taking the shape which in cross section is a circular ring or a portion of such ring. The mold size (walls) ACEG and BDFH were randomly chosen in terms of shape. The parison wall enters the configuration at 15. Curve 10 shows the various locations for the centers of the circular-shaped parison sections as the parison contacts successive points along the walls of the mold.

In this FIG. 5 the abbreviations have the following meaning:

WW: This is a center where the parison touches two walls and moves along the two walls.

PW: This a center where the parison touches a corner on one side and moves along a wall.

PP: This is a location where the parison is expanded around two corners.

WWP: This is a location where the parison is blown around a corner touching two walls.

The subscripts in FIG. 5 refer to the respective wall sections of the mold and the respective corners shown. Thus, $W_D$ refers to the wall D, $P_e$ refers to the corner e, etc.

Figure 6:
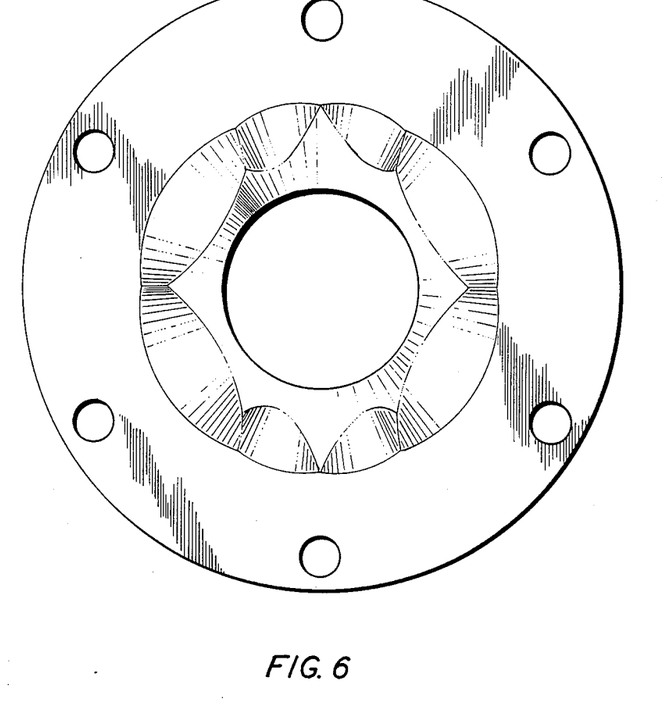
FIG. 6 shows an axial view of a die bushing having eight cuts, two of which are functionally shown in FIG. 2 representing an approximation of the computed shaping.

In FIG. 6, a shaped bushing of a blow molding extrusion die according to the above approximated shaping has been shown. The shaping took the form of eight cuts in this example. The cuts correspond to the ones shown in FIG. 2 or, respectively 3A.

Reasonable variations and modifications which will become apparent to those skilled in the art can be made in this invention without departing from the spirit and scope thereof.

What is claimed is:

1. A process for blow molding an article from a tubular parison extruded through a die gap defined by two die elements including a mandrel and a bushing, comprising the steps of:
   (a) determining a desired wall thickness distribution for a blown article at a given mold cross section defined by a number of straight line segments;
   (b) calculating a desired die gap necessary to achieve said desired wall thickness distribution, said calculating being based on a wall thickness distribution in a blown article at said given mold cross section, said blown article obtained from a substantially constant wall thickness parison;
   (c) forming an approximation of the desired die gap calculated in step (b) by making a plurality of overlapping circular cuts in at least one of the die elements, said plurality of overlapping circular cuts being related to said number of straight line segments which define said mold cross section and including twice as many cuts in one of the die elements as there as straight line segments defining said mold cross section;
   (d) extruding a parison through the die gap formed in step (c); (e) blow molding the parison to form a blown article having approximately the desired wall thickness distribution as determined in step (a).

2. A process in accordance with claim 1 wherein the functional surface of said mandrel and said bushing are essentially in flow direction outwardly tapering frusto-conical surfaces, at least one of which has been shaped to said non-circular cross section.

3. A process in accordance with claim 2 wherein said bushing has been shaped by a plurality of sets of two cuts, each set of cuts being essentially identical in depth and width and wherein the radius, offset and angular location of the cuts can be computed by the following formula $$r = \frac{(x^2 + y^2 - 2xy\cos\theta)^{\frac{1}{2}}}{2\cos\left(\arcsin\frac{x}{(x^2 + y^2 - 2xy\cos\theta)^{\frac{1}{2}}}\sin\theta\right)}$$

$$s = y - r$$

wherein r equals radius of the respective cut,
s equals offset of the cutting tool center from the bushing axis,
$\theta$ equals the angle between the respective cuts maximums,
x equals the radius of the bushing plus the required die shaping cut depth for the first of the two cuts,
y equals the radius of the bushing plus the required die shaping cut depth for the second of the two cuts.

4. A process in accordance with claim 1 wherein said overlapping cuts extend completely around the circumference of said die gap.

5. A process in accordance with claim 4 wherein said cross section of said mold is in the shape of a polygon.

6. A process in accordance with claim 5 wherein a set of two cuts are provided for each of said straight line segments and wherein, each set of cuts is essentially identical in depth and width.

7. A process in accordance with claim 6 wherein said cross section is rectangular and wherein four sets of cuts for a total of eight cuts are provided.

* * * * *